United States Patent [19]

Hammond et al.

[11] Patent Number: 5,638,525

[45] Date of Patent: Jun. 10, 1997

[54] PROCESSOR CAPABLE OF EXECUTING PROGRAMS THAT CONTAIN RISC AND CISC INSTRUCTIONS

[75] Inventors: Gary N. Hammond, Campbell, Calif.; Kevin C. Kahn, Portland, Oreg.; Donald B. Alpert, Santa Clara, Calif.

[73] Assignee: Intel Corporation, Santa Clara, Calif.

[21] Appl. No.: 386,931

[22] Filed: Feb. 10, 1995

[51] Int. Cl.[6] .................................................. G06F 9/30
[52] U.S. Cl. ............................................................ 395/385
[58] Field of Search .................... 364/DIG. 1 MS File, 364/DIG. 2 MS File; 395/375, 700, 800, 376, 381, 382, 383, 384, 385, 386, 701

[56] References Cited

U.S. PATENT DOCUMENTS

4,839,797  6/1989  Katori et al. ........................ 364/200
5,481,684  1/1996  Richter et al. ....................... 395/375

*Primary Examiner*—Robert B. Harrell
*Attorney, Agent, or Firm*—Blakely, Sokoloff, Taylor & Zafman

[57] ABSTRACT

A data processor is described. The data processor is capable of decoding and executing the first instruction of a first instruction set and the second instruction of a second instruction set wherein the first instruction and the second instruction originate from a single computer program. Alternatively, the data processor can also execute a first instruction of a first instruction set in a first instruction set mode, receive a first interruption indication in the first instruction set mode, service the first interruption indication in a second instruction set mode, return to the first instruction set mode, receive a second interruption indication in the first instruction set mode, and service the second interruption indication in the first instruction set mode.

19 Claims, 7 Drawing Sheets

PROCESSOR CAPABLE OF EXECUTING PROGRAMS THAT CONTAIN RISC AND CISC INSTRUCTIONS

FIELD OF THE INVENTION

The present invention relates to the field of electronic data processing devices. More particularly, the present invention relates to the operation of a data processor.

BACKGROUND OF THE INVENTION

Traditionally, a processor could only accept operating systems and application programs in the instruction set for the particular processor. It could not accept operating systems and application programs in another instruction set. Thus, when processor architecture and instruction sets were modified to incorporate technological advancements in a new processor, the existing software base of operating systems and application programs could not be utilized. New operating systems and application programs had to be developed.

One prior processor did have the capability of accepting an application program in one instruction set (VAX code) and also accepting an application program in an earlier instruction set (PDP-11 code). However, the prior processor could only accept an operating system in one instruction set (VAX code) and could not accept an operating system in another instruction set e.g. PDP-11 code. In addition, the prior processor could only accept an application program entirely in one instruction set, VAX code or PDP-11 code, but could not accept an application program with instructions from both instruction sets. Two previously unrecognized problems existed with the prior processor. First, because the prior processor could only accept an operating system in one instruction set (VAX code), an entirely new operating system had to be developed at a large cost. Existing functionalities of the older operating system could not be utilized even if the technological advancements did not provide benefits for those functions. Secondly, because the prior processor could only accept an application program in one instruction set or another, software developers had the difficult choice of incurring large development costs to develop an entirely new application program or forgo the benefits of technological advancements offered by a new instruction set. They did not have the option of implementing a new instruction set where justified by performance advantages and utilizing the existing software where justified by cost considerations.

Thus, a processor with the capability of accepting multiple operating systems is needed. What is also needed is a processor with the capability of accepting an application program with instructions from multiple instruction sets.

SUMMARY OF THE INVENTION

A novel data processor is described. The data processor comprises a bus interface unit capable of receiving a first instruction of a first instruction set and a second instruction of a second instruction set. The first instruction and the second instruction originate from a single computer program. The data processor also comprises an internal bus coupled to the bus interface unit capable of transmitting the first instruction of the first instruction set and the second instruction of the second instruction set from the bus interface unit and also comprises an instruction unit coupled to the internal bus capable of decoding and executing the first instruction of a first instruction set and the second instruction of a second instruction set.

Under a first embodiment, the instruction unit comprises an instruction cache coupled to the internal bus capable of storing the first instruction and the second instruction, a first decoder coupled to the instruction cache capable of decoding the first instruction of the first instruction set, a second decoder coupled to the instruction cache capable of decoding the second instruction of the second instruction set, a multiplexor coupled to the first decoder and the second decoder capable of selecting from the first decoder and the second decoder in response to a signal, and an execution unit coupled to the multiplexor capable of executing a selected decoded instruction from the multiplexor. The instruction unit can further comprise an instruction set mode selector coupled to the first decoder, the second decoder and the multiplexor capable of transmitting the signal to the multiplexor in response to an instruction to switch a current mode from the first decoder or the second decoder.

Under a second embodiment, the instruction unit comprises a first instruction cache coupled to the internal bus capable of storing the first instruction, a first decoder coupled to the first instruction cache capable of decoding the first instruction, a first execution unit coupled to the first decoder capable of executing the first instruction, a second instruction cache coupled to the internal bus capable of storing the second instruction, a second decoder coupled to the second instruction cache capable of decoding the second instruction, and a second execution unit coupled to the second decoder capable of executing the second instruction. The first execution unit is responsive to a signal to initiate execution and the second execution unit is responsive to the signal to initiate execution.

Under a third embodiment, the instruction unit comprises a translator coupled to the internal bus capable of translating the first instruction of the first instruction set into corresponding instructions of the second instruction set, an instruction cache coupled to the internal bus and coupled to the translator capable of storing the second instruction of the second instruction set and capable of storing the corresponding instructions of the second instruction set, and an execution unit coupled to the instruction cache capable of executing the second instruction of the second instruction set and capable of executing the corresponding instructions of the second instruction set. The instruction unit can further comprise a decoder coupled to the instruction cache capable of decoding the second instruction of the second instruction set and capable of decoding the corresponding instructions of the second instruction set. The processor can further comprise a control read only memory device storing microcode instructions. The translator receives the microcode instructions to translate the first instruction of the first instruction set into corresponding instructions of the second instruction set.

A method for executing instructions of a computer program in a processor is also described. The method comprises executing a first instruction of a first instruction set, executing a first switch instruction, switching from a first instruction set mode to a second instruction set mode, and executing a second instruction of a second instruction set. The method can further comprise executing a second switch instruction, switching from the second instruction set mode to the first instruction set mode, and executing a second instruction of the first instruction set. Alternatively, the method can comprise executing a first instruction of a first instruction set in a first instruction set mode, receiving a first interruption indication in the first instruction set mode, servicing the first interruption indication in a second instruction set mode, returning to the first instruction set mode, receiving a second interruption indication in the first instruction set mode, and servicing the second interruption indication in the first instruction set mode. Servicing the first interruption indication in a second instruction set mode can comprise determining the first interruption, determining a descriptor entry number for the first interruption, storing a 64 bit intercept gate associated with the descriptor entry number wherein the intercept gate refers to a memory address, and executing a service routine in the 64 bit instruction set mode for the first event starting at the memory address. Servicing said second interruption indication in the first instruction set mode can comprise determining the second interruption, determining a descriptor entry number for the second interruption, storing a descriptor gate associated with the descriptor entry number wherein the descriptor gate refers to a memory address, and executing a service routine in the 16 and 32 bit instruction set mode for the second event starting at the memory address.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A novel data processor capable of transitioning between instruction sets is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
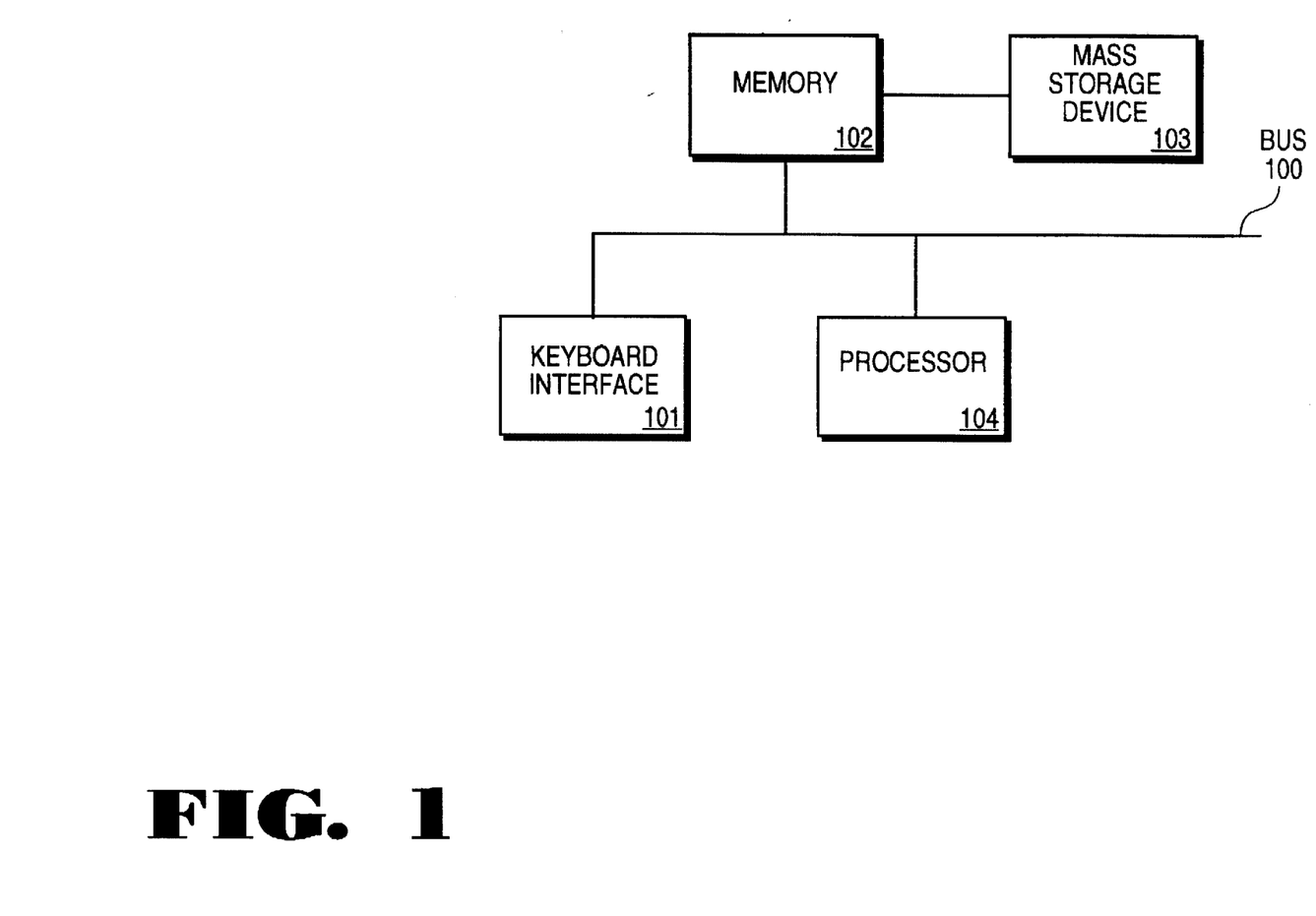
FIG. 1 illustrates in block diagram form a computer system of one embodiment of the present invention.

FIG. 1 illustrates in block diagram form a computer system of one embodiment of the present invention. The computer system comprises bus 100, keyboard interface 101, external memory 102, mass storage device 103 and processor 104. Bus 100 can be a single bus or a combination of multiple buses. As an example, bus 100 can comprise an Industry Standard Architecture (ISA) bus, an Extended Industry Standard Architecture (EISA) bus, a system bus, a X-Bus, PS/2 bus, a Peripheral Components Interconnect (PCI) bus, a Personal Computer Memory Card International Association (PCMCIA) bus or other buses. Bus 100 can also comprise combinations of any buses. Bus 100 provides communication links between components in the computer system. Keyboard controller 101 can be a dedicated device or can reside in another device such as a bus controller or other controller. Keyboard controller 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information from mass storage device 103 and processor 104 for use by processor 104. Mass storage device 103 can be a hard disk drive, a floppy disk drive, a CD-ROM device, or a flash memory device. Mass storage device 104 provides information to external memory 102. Processor 104 can be a microprocessor and is capable of decoding and executing a computer program such as an application program or operating system with instructions from multiple instruction sets.

Figure 2:
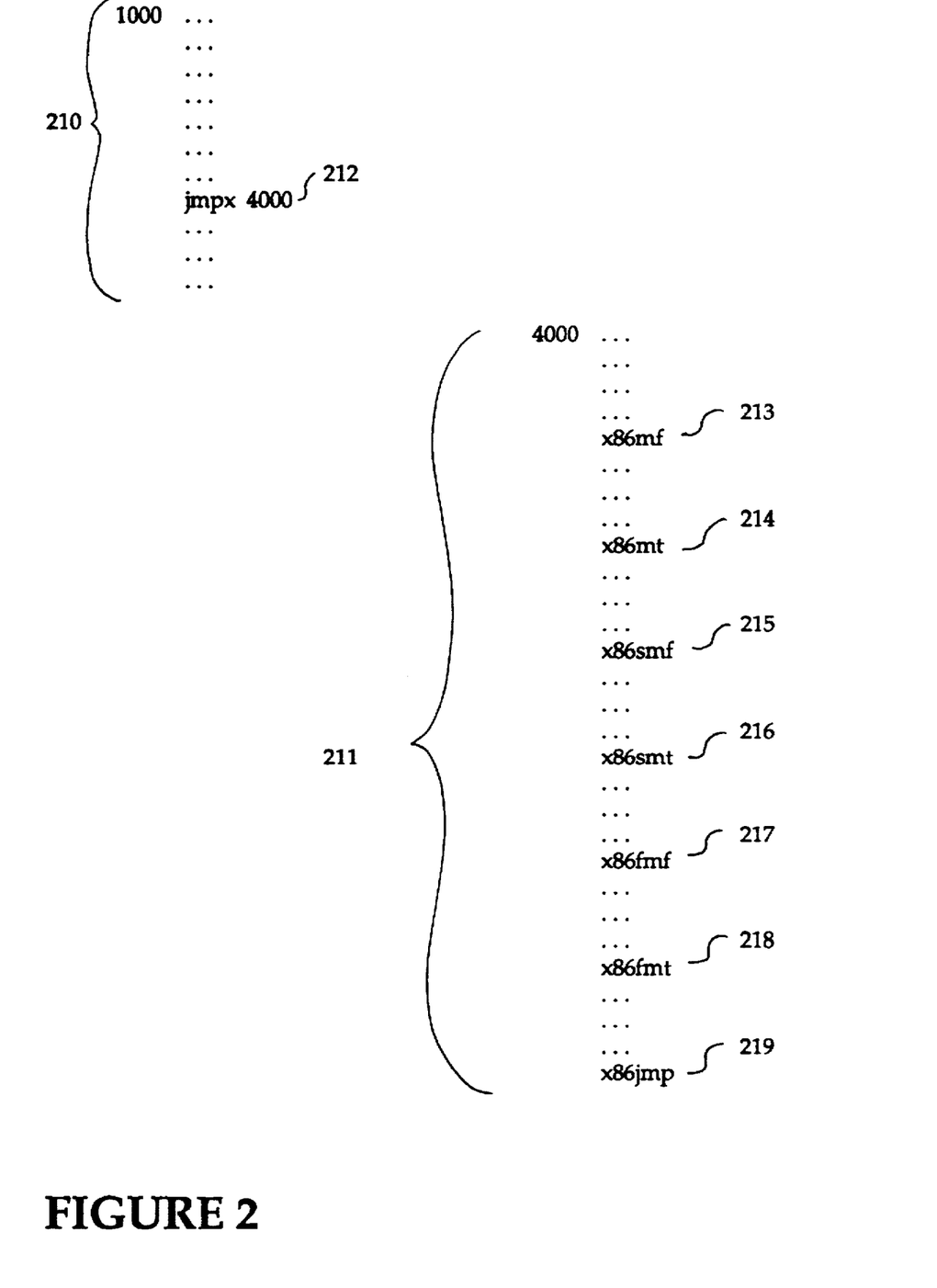
FIG. 2 illustrates an application program executed by a processor of a second embodiment of the present invention.

FIG. 2 illustrates a computer program executed by a processor of a second embodiment of the present invention. The computer program comprises instructions 210 of a first instruction set and instructions 211 of a second instruction set. The first instruction set can be an instruction set for a complex instruction set computing (CISC) processor or an instruction set for a reduced instruction set computing (RISC) processor. The first instruction set can also be a 16 and 32 bit instruction set or a 64 bit instruction set. The second instruction set is an instruction set different from the first instruction set. It can be a RISC instruction set or a CISC instruction set. It can also be a 64 bit instruction set or a 16 and 32 bit instruction set. It will be appreciated that the first and the second instruction sets can be instruction sets of other types.

Instructions 210 comprises switch instruction 212. Processor 104 decodes and executes individual instructions of instructions 210. The individual instructions of instruction 210 come from the first instruction set. Thus, processor 104 decodes and executes the individual instructions in the first instruction set mode. When processor 104 decodes and executes switch instruction 212, processor 104 switches from the first instruction set mode to the second instruction set mode. In this example, switch instruction 212 is a jmpx followed by a value. This value can be converted by processor 104 to an address which indicates the location of the next instruction for decoding an execution by processor 104. In this example, the address is 4,000. The processor then decodes and executes instructions beginning at address 4,000 which also marks the beginning of instructions 211.

Instructions 211 comprises of individual instructions of the second instruction set. Having already switched to the second instruction set mode, processor 104 proceeds to decode and execute instructions of the second instruction set. When processor 104 decodes and executes move from instruction 213, processor 104 writes a value in a specified register of the first instruction set to a specified register of the second instruction set. The term x86 used in following description refers to the Intel Architecture developed by Intel Corporation.

The x86mf instruction instructs processor 104 to move a value in a specified x86 integer register to a specified 64 bit integer register. Processor 104 then performs operations using the value in the 64 bit integer register. When processor 104 decodes and executes move to instruction 214, processor 104 loads a value in a specified register of the second instruction set to a specified register of the first instruction set. The x86mt instruction instructs processor 104 to load a value from a specified 64 bit integer register to a specified x86 integer register. When processor 104 decodes and executes x86smf instruction 215, processor 104 loads a value from a specified x86 segment selector or descriptor register to a specified 64 bit integer register. Processor 104 then performs operations using the value from the specified x86 segment selector or descriptor register. When processor 104 decodes and executes x86smt instruction 216, processor 104 loads a value from a specified 64 bit integer register to a specified x86 segment selector or descriptor register. When processor 104 decodes and executes x86fmf instruction 217, processor 104 loads a value from a specified x86 floating point register, floating point control, status or exception register to a specified floating point register for the second instruction set. Processor 104 then performs operations using the value from the specified floating point register, floating point control, status or exception register. When processor 104 decodes and executes x86fmt instruction 218, processor 104 loads a value from a specified floating point register of the second instruction set to a specified x86 floating point register, floating point control, status or exception register. When processor 104 decodes and executes switch instruction 219, it switches to the first instruction set mode and executes instructions beginning from a specified address.

In this example, switch instruction 219 is x86jmp and the specified address is 1011. Table 1 summarizes the processor instructions that can be accepted by processor 104. The specific instructions in Table 1 an their features are detailed for illustrative purposes only. It will be appreciated that other instructions which incorporate certain features of the present invention can also be utilized.

TABLE I

| EVRET | | Event Return |
|---|---|---|
| Format: | evret | |
| Description: | The EVRET instruction is used to return from event handlers. It also can be used to dispatch | |

TABLE I-continued

| | |
|---|---|
| | processing at lower privilege levels. EVRET restores the target execution environment contained in XIP1 and XPCR1 into XIP and XPCR. EVRET is a privileged instruction. EVRET ensures: <br> 1) all changes to XPCR and the TLB that affect the fetching of instructions from the instruction stream are visible by the next instruction boundary; <br> 2) all changes to XPCR and the TLB that affect the actual execution of an instruction are visible by the next instruction boundary; <br> 3) and all changes to operand resources (those resources within the processor that can be input operands to subsequent instructions) are visible by the next instruction boundary. EVRET ensures all previous instructions are completed. EVRET also ensures subsequent instructions fetching and execution uses the updated values of XPCR and the TLB. Note: EVRET does not perform a memory fence operation nor is full serialization performed like the SRLZ instruction. <br> On x86 compatible implementations, EVRET returns control to either the x86-ISA or 64-bit ISA as specified by XPCR1.ISA. If control is resumed in the x86 ISA, and the target XIP exceeds the CS limit, a x86 GPFault is reported on the target x86 ISA instruction. If XPCR1.d86i or XPCR.d86r is set the EVRET is completed and a Disabled x86 ISA or Disabled x86 Register fault is generated on the target instruction. <br> Similarly, if control is being resumed in the 64-bit ISA and XPCR1.dxi is set, EVRET is completed and a Disabled 64-bit ISA fault is generated on the target instruction. <br> Note: 64-bit event delivery and EVRET do not save or restore the previous value of CS. It is software's responsibility to save/restore CS if it is modified within the event handler. |
| Exceptions: | Privileged Instruction Fault, GPFault, Disabled x86 ISA fault, Disabled 64-bit ISA fault, Disabled x86 Register fault, Reserved field fault |

| x86JMP | Jump and Change to x86 ISA |
|---|---|
| Format: | x86jmp rel17 <br> x86jmp iscr1 |
| Description: | The processor switches execution to the x86 instruction set, and executes the next instruction at the target address. The relative form computes the target address in the 64-bit ISA relative to the current XIP and Code Segment base, i.e. XIP = XIP + rel17*4 -CS_base. Note that the target instruction pointer is converted into the effective address space. rel17 is sign extended and multiplied by four. The target XIP is truncated to 32-bits. <br> The register form performs a far control transfer by loading the code segment specified by the 16-bit selector in iscr1 [47:32] and the 32-bit offset specified in iscr1 [31:0]. If EFLAGS.VM86 is set the processor shifts the 16-bit selector left by 4-bits to load the CS base. If EFLAGS.VM86 is zero the processor loads the CS descriptor for the LDT/GDT and performs segmentation protection checks. The target XIP is truncated to 32-bits. <br> X86JMP can be performed at any privilege level and does not change the privilege level of the processor. <br> If the target XIP exceeds the CS limit, a x86 GPFault is reported on the target instruction. CS segment protection faults are reported on the target instruction. Gate descriptors are not allowed and result in a GPFault on the target instruction. If XPCR.d86i or XPCR.d86r is set the instruction is nullified and a Disabled x86 ISA |

TABLE I-continued

| | |
|---|---|
| | fault or Disabled x86 Register fault is generated on the X86JMP instruction. If Jump Breakpoints are enabled a Jump Debug trap is taken after the instruction completes. On 64-bit only subset implementations, X86JMP causes a reserved opcode fault. |
| Exceptions: | Disabled x86 ISA Fault, Disabled x86 Register Fault, GPFault, Reserved Opcode Fault, Debug Jump Breakpoint |

| x86MT | Move to x86 Register |
|---|---|
| Format: | x86mt  isrc2, dest |
| Description: | The x86 32-bit integer register specified by dest is loaded from the 64-bit extension integer register isrc2. Transfers to the x86 32-bit integer registers are truncated from the low order 32-bits of isrc2. x86 16-bit and 8-bit sub-registers (AX, AL, etc.) cannot be accessed separately. If x86 registers are disabled to XPCR.d86r, a Disabled x86 register fault is generated. Accesses to reserved registers results in a reserved opcode fault. On 64-bit only subset implementations X86MT causes a reserved opcode fault. |
| Exceptions: | Disabled x86 register fault, Privilege Instruction fault Reserved Opcode fault. |

| x86MF | Move from x86 Register |
|---|---|
| Format: | x86mf  src2, idest |
| Description: | The x86 32-bit integer register specified by src2 is written into the 64-bit extension integer register idest. The destination register is zero extended to 64-bits. x86 8-bit and 16-bit sub-registers (AX, AL, etc.) cannot be separately accessed. If x86 registers are disabled by XPCR.d86r, a Disabled x86 register fault is generated. Accesses to reserved registers results in a reserved opcode fault. On 64-bit only subset implementations X86MF results in a reserved opcode fault. |
| Exceptions: | Disabled x86 register fault, Reserved Opcode Fault. |

| X86SMT | Move to x86 Segment Register |
|---|---|
| Format: | x86smt  isrc2, dest |
| Description: | The x86 64-bit segment selector or descriptor register specified by dest is loaded from the 64-bit extension integer register isrc2. Transfers are truncated to the destination register size. This instruction can only be executed in kernel mode else a privilege instruction fault results. If x86 registers are disabled by XPCR.d86r a Disabled x86 register fault is generated. Accesses to reserved registers results in a reserved opcode fault. On 64-bit only subset implementations X86SMT results in a reserved opcode fault. |
| Exceptions: | Disabled x86 register fault, Privileged Instruction fault, Reserved Opcode fault. |

| x86SMF | Move from x86 Segment Register |
|---|---|
| Format: | x86smf  src2, idest |
| Description: | The x86 64-bit segment selector or descriptor register specified by src2 is loaded into the 64-bit extension integer register idest. Transfers are zero extended from 16 or 32-bits to 64-bits. If x86 registers are disabled by XPCR.d86r, a Disabled x86 register fault is generated. Accesses to reserved registers results in a reserved opcode fault. On 64-bit only subset implementations x86SMF results in a reserved opcode fault. |
| Exceptions: | Disabled x86 register fault, Reserved Opcode fault. |

| x86FMT | Floating Point Move to x86 Register |
|---|---|
| Format: | x86fmt  fsrc2, dest |
| Description: | The x86 80-bit floating point register or 32/16-bit floating point control, status or exception register specified by dest is loaded from the extension floating point register fsrc2. Dest is an absolute register id, not stack relative. Transfers from the extension 80-bit floating point registers to the x86 floating point stack are converted to the x86 80-bit floating point format. Software must first issue FNORM on the extension register to normalize any unnormalized single or double precisions subnormals before the transfer is performed. Transfers to the 16/32-bit floating point control, status and exception registers are truncated from the low order 32/16-bits of the significand of fsrc2. If x86 floating point registers are disabled by XPCR.d86f, a Disabled x86 floating point register fault is generated. If the extension floating point registers are disabled by XPCR.dxf then a Disabled Floating Point fault is generated. Accesses to reserved registers results in a reserved opcode fault. On 64-bit only subset implementations x86FMT yields a reserved field fault. |
| Exceptions: | Disabled Floating Point Fault, Disabled x86 Floating Point register fault, Reserved Opcode Fault. |

| x86FMF | Floating Point Move from x86 Register |
|---|---|
| Format: | x86fmf  src2, fdest |
| Description: | The x86 80-bit floating point register or 32/16-bit floating point control, status or exception register specified by src2 is loaded into the 80-bit extension floating point register fdest. Src2 is an absolute register id, not stack relative. Data transferred from the x86 80-bit floating point stack to the extension registers are converted to the extension register format. Transfers from the 16/32-bit floating point control, status or exception registers are zero extended to 64-bits and then written into the significand of fdest. The sign-exponent field of fdest is written with zeros. If x86 floating point registers are disabled by XPCR.d86f, a Disabled x86 floating point register fault is generated. If the extension floating point registers are disabled by XPCR.dxf a Disabled Floating Point fault is generated. Accesses to reserved registers results in a reserved opcode fault. On 64-bit only implementations, X86FMF yields a Reserved Opcode Fault. |
| Exceptions: | Disabled Floating Point fault, Disabled x86 Floating point register fault, Reserved Opcode Fault. |

| JMPX | Jump and Change to 64-bit ISA |
|---|---|
| Format: | jmpx  rel32/16<br>jmpx  r/m32/16 |
| Description: | The processor jumps and execution begins at the target instruction in the 64-bit ISA. There are two forms; register/memory indirect and relative. The relative form computes the target address in the 64-bit ISA relative to the current XIP and Code segment base, i.e. XIP = XIP + rel32/16 + CS_base. Note that the target instruction pointer is converted in the linear address space. The target XIP is truncated to 32-bits. The indirect form reads a register or memory |

TABLE I-continued

| | |
|---|---|
| | location specified by r/m32/16 and sets the linear target instruction pointer to that value. The target XIP is truncated to 32-bits. JMPX can be performed at any privilege level and does not change the privilege level of the processor. JMPX ensures all outstanding x86 floating point operations have completed. If XPCR.dxi is set, the instruction is nullified and a Disabled 64-bit ISA fault is generated. If 64-bit extensions are disabled, JMPX is an illegal x86 ISA opcode. If Jump Breakpoints are enabled, a Jump Debug trap is taken after the instructions completes. |
| Exceptions: | Disabled 64-bit ISA fault, Illegal Opcode Fault, Debug Jump Breakpoint. |
| IRET | Interrupt Return |
| Format: | iret |
| Description: | If 64-bit extensions are enabled, IRET returns control to either the x86-ISA or 64-bit ISA as specified by XPCR.ISA in the stack frame before IRET is executed. IRET uses the extended x86 stack frame shown below. |

```
                    |                   |
                    |                   | <-- Old ESP
                    |   XPCR[63:32]     |
   Decreasing       |___________________|
   Addresses        | XPCR[31:16] | CS* |
                    |___________________|
                    |   XIP[31:0]       |
     V              |                   | <-- New ESP
```

| | |
|---|---|
| | While 64-bit extensions are enabled, IRET performs as specified in the P5 PRM, with the following modifications:<br>1) XPCR[63:16] is popped in place of EFLAGS. XPCR[15:2] is left unmodified.<br>2) XPCR[1:0] is set to the target CPL of the original environment, i.e. the lower 2-bits of the popped CS selector.<br>3) XIP[31:0] is popped in place of EIP. XIP[63:32] is set to zero.<br>If control is resumed in the x86 ISA, and the target XIP exceeds the CS limit, a x86 GPFault is reported on the IRET instruction. If the new XPCR.d86i or XPCR.d86r is set, IRET is nullified and a Disabled x86 ISA fault or Disabled x86 Register fault is generated.<br>Similarly, if control is resumed in the 64-bit ISA and the new XPCR.dxi is set, IRET is nullified and a Disabled 64-bit ISA fault is generated.<br>IRET serializes instruction execution. |
| Exceptions: | Disabled 64-bit ISA fault, Disabled x86 ISA fault, Disabled x86 Register fault, GPFault. |

In this embodiment, the processor has two separate sets of registers, one set for the first instruction set mode and one set for the second instruction set mode. The x86mt, x86mf, x86smt, x86smf, x86fmt and x86fmf instructions are used to instruct the processor to transfer values between the two sets of registers. Under an alternative embodiment, the processor only has one set of registers that is used for both the first instruction set mode and the second instruction set mode. In this situation with one set of registers, the x86mt, x86mf, x86smt, x86smf, x86fmt and x86fmf instructions would not be used.

Under a second embodiment of the present invention, processor 104 can accept an operating system that is in the first instruction set or in the second instruction set. In this example, the first instruction set is x86 code and the second instruction set is 64 bit code. The term x86 code refers to the instruction set utilized by the Intel Architecture family of microprocessors e.g. 8086, 80286, 80386, 80486 and Pentium microprocessors manufactured by Intel Corporation. An example of an operating system in x86 code is MS-DOS. When processor 104 is initially turned on, processor 104 begins in the first instruction set mode and can accept an operating system of the first instruction set. If an operating system of the first instruction set such as MS-DOS is utilized, processor 104 remains in the first instruction set mode. On the other hand, if an operating system of the second instruction set is utilized, the operating system will have a jmpx processor instruction. Upon receipt of the jmpx instruction, processor 104 switches to the second instruction set mode. Processor 104 then executes the rest of the operating system in the second instruction set mode.

In this embodiment, processor 104 can also operate from an operating system with instructions from both the first instruction set and the second instruction set. Processor 104 can execute instructions from the first instruction set using the first instruction set mode and can also execute instructions from the second instruction set using the second instruction set mode. The switch from the first instruction set mode to the second instruction set mode and the switch from the second instruction set mode to the first instruction set mode can occur without rebooting processor 104 and the rest of the computer system.

When processor 104 is initially powered up, processor 104 can operate from either an operating system in the first instruction set or an operating system in the second operating system. Processor 104 can also operate from a single unified operating system which has instructions from the first instruction set and the second instruction set. Processor 104 can then execute an application program of the first instruction set. While executing an application program of the first instruction set, processor 104 can receive an event indication. The event can be an exception, machine check or interrupt. After receiving the event indication, processor 104 determines the nature of the particular event. Processor 104 determines the nature of the particular event by requesting the identification of the device creating the event from a programmable interrupt controller in the computer system. Each device has an event line and a number associated with it. Processor 104 then determines a descriptor entry number for the particular event. In a x86 operating system or an operating system having some x86 operating system features along with portions of the operating system in the second instruction set, the descriptor entry number is determined by requesting the information from the programmable interrupt controller. The programmable interrupt controller adds the three-bit binary value of the highest active bit in the interrupt service routine register to the base address stored in an initialization command word register. Processor 104 receives the descriptor entry number and determines the actual start memory address for the event by multiplying the descriptor event number by four. Processor 104 then retrieves the gate at the start memory address from a descriptor table and executes the instructions in the gate or the instructions referred to by the gate.

In an operating system having some x86 operating system features along with portions of the operating system in the second instruction set, the gate may have a 64 bit intercept. If the gate has a 64 bit intercept, the 64 bit intercept will include a jmpx processor instruction along with instructions of the second instruction set or a special bit pattern to switch to the second instruction set mode. Alternatively, the jmpx instruction and the operating system instructions of the second set or the special bit pattern can be located elsewhere in memory with an address reference in the 64 bit intercept gate. The jmpx instruction causes processor 104 to switch to the second instruction set mode. The special bit pattern also causes processor 104 to switch to the second instruction set mode. Processor 104 then executes instructions of the second instruction set in the 64 bit intercept. The instructions of the second instruction set in the 64 bit intercept is an event handling routine for the event which in turn, comprises a portion of operating system in the second instruction set. In this manner, processor 104 switches from the portion of the operating system in the first instruction set to the portion of the operating system in the second instruction set and switches from the first instruction set mode to the second instruction set mode. At the end of the event handling routine, processor 104 receives an evret instruction. The evret instruction returns processor 104 from the event handling routine to the application program and restores the target execution environment.

On the other hand, if the gate does not have a 64 bit intercept and is an x86 gate instead, processor 104 remains in the first instruction set mode and does not switch to the second instruction set mode. The gate in this case, does not cause a switch to the second instruction set mode. A x86 interrupt, call or task switch mechanism is used.

Processor 104 can also execute an application program of the second instruction set. While executing this application program, processor 104 can receive an event indication as in the previous example. The event can be an exception, machine check or interrupt. After receiving the event indication, processor 104 determines the source of the particular event. Processor 104 determines the source of the particular event by requesting the identification of the device creating the event from a programmable interrupt controller in the computer system. Each device has an event line and a number associated with it. Processor 104 then determines a descriptor entry number for the particular event.

The descriptor entry number can be determined by requesting the information from the programmable interrupt controller. The programmable interrupt controller adds the three-bit binary value of the highest active bit in the interrupt service routine register to the base address stored in an initialization command word register. The programmable interrupt controller also transmits information indicating the nature of the particular event. The information which is stored by processor 104 in a control register or a plurality of control registers in processor 104. Processor 104 receives the descriptor entry number and determines the actual start memory address of the handler selector for the event by multiplying the descriptor event number by four. Processor 104 then retrieves the handler selector at the start memory address from a descriptor table and executes the instructions in the handler selector. In executing the instructions in the handler selector, processor 104 retrieves a value or a plurality of values from one or more control registers in processor 104 which indicate the nature of the particular event. From the value or plurality of values, processor 104 determines the actual start memory address of the handler for the particular event. Processor 104 then retrieves the handler at the start memory address and executes the instructions in the handler or the instructions referred to by the handler. Processor 104 executes the instructions in the second instruction set mode.

Figure 3:
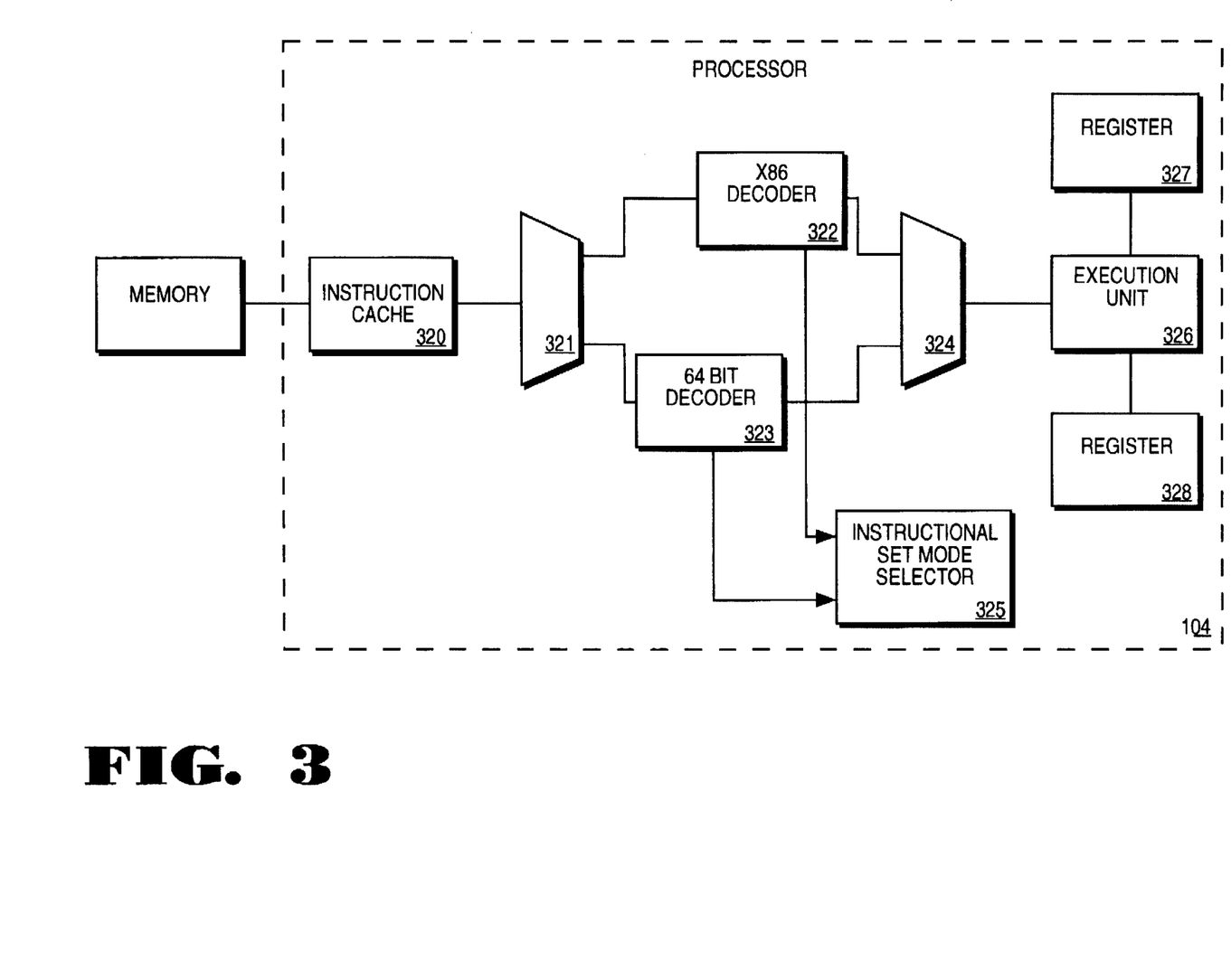
FIG. 3 illustrates in block diagram form a processor of a third embodiment of the present invention.

FIG. 3 illustrates in block diagram form a processor of a third embodiment of the present invention. Under this embodiment, processor 104 comprises instruction cache 320, demultiplexor 321, x86 decoder 322, 64 bit decoder 323, multiplexor 324, instruction set mode selector 325, execution unit 326, register 327 and register 328. Instruction cache 320 is coupled to external memory and receives instructions from external memory. The instructions can be instructions of the first instruction set or instructions of the second instruction set. Instruction cache 320 stores the instructions until they are decoded and executed. At the appropriate time for decoding an instruction, an individual instruction in instruction cache 320 is transmitted through demultiplexor 321. Demultiplexor 321 selects either x86 decoder 322 for decoding of the instruction from instruction cache 320 in the first instruction set mode or selects 64 bit decoder 323 for decoding of the instruction from instruction 320 in the second instruction set mode. The selection of demultiplexor 321 is based on the signal received by demultiplexor 321 from instruction set mode selector 325. A first signal from instruction set mode selector 325 causes demultiplexor 321 to select x86 decoder 322 and the first instruction set mode. A second signal from instruction set mode selector 325 causes demultiplexor 321 to select 64 bit decoder 323 and the second instruction set mode. When processor 104 initially powers up, processor 104 can power up in the first instruction set mode or the second instruction set mode depending on the initialization procedures. An initial value is transmitted to instruction set mode selector 325 and instruction set mode selector 325 in turn transmits the first signal or the second signal in response to the value.

In this example, processor 104 powers up in the first instruction set mode. Thus, demultiplexor 321 initially receives a first signal from instruction set mode selector 325 and selects x86 decoder 322. Instructions transmitted from instruction cache 320 through demultiplexor 321 is decoded by x86 decoder 322. The instruction is then transmitted to multiplexor 324. Like demultiplexor 321, multiplexor 324 is also controlled by instruction set mode selector 325. When multiplexor 324 receives a first signal from instruction set mode selector 325, multiplexor 324 selects x86 decoder 322 as its input. On the other hand, when multiplexor 324 receives a second signal from instruction set mode selector 325, multiplexor 324 selects 64 bit decoder 323 as its input.

After multiplexor 324, the instruction is then transmitted to execution unit 326. Execution unit 326 executes the decoded instruction. Execution unit 326 can receive instructions from x86 decoder 322 or 64 bit decoder 323. Execution unit 326 is also coupled to register 327 which store values when processor 104 is in the first instruction set mode. Execution unit 326 is also coupled to register 328 which stores values when processor 104 is in the second instruction set mode. Thus, in response to a x86mf, x86smf, or x86fmf instruction, execution unit 326 can retrieve values from register 327 for use while executing processor instructions of the second instruction set. Likewise, in response to a x86mt, x86smt or x86fmt instruction, execution unit 326 can also store values into register 327. When x86 decoder 322 decodes a jmpx instruction, x86 decoder 322 sends a switch instruction to instruction set mode selector 325. In response to this signal, instruction set mode selector 325 transmits a second signal to demultiplexor 321 and multiplexor 324. This second signal causes demultiplexor 321 to transmit instructions from instruction cache 320 to 64 bit decoder 323. The second signal also causes multiplexor 324 to select as its input 64 bit decoder 323. Instructions from 64 bit decoder 323 are transmitted through multiplexor 324 to execution unit 326. When 64 bit decoder 323 decodes a x86jmp instruction, 64 bit decoder 323 transmits a switch signal to instruction set mode selector 325. In response to this signal, instruction set mode selector 325 transmits a first signal to demultiplexor 321 and multiplexor 324. The first signal causes demultiplexor 321 to select x86 decoder 322 and causes multiplexor 324 to select x86 decoder 322 as its input. In this manner, processor 104 returns back to the first instruction set mode.

Processor 104 can further comprise a jmpx disable register. The jmpx disable register is coupled to x86 decoder 322 or instruction set mode selector 325. When the jmpx disable register is set, the jmpx instruction is nullified and a jmpx instruction results in a disabled 64 bit ISA fault. Processor 104 does not switch to the second instruction set mode in response to a jmpx instruction. Likewise, processor 104 can further comprise a x86jmp disable register. The x86jmp disable register is coupled to 64 bit decoder 323 or instruction set mode selector 325. When the x86jmp disable register is set, the x86jmp instruction is nullified and a x86jmp instruction results in a disabled x86 ISA fault. Processor 104 does not switch to the first instruction set mode in response to a x86jmp instruction.

Alternatively, register 327 stores values when processor 104 is in the first instruction set mode and also stores values when processor 104 is in the second instruction set mode. In this case, register 327 performs the functions of register 328 and register 328 is eliminated or incorporated into register 327. Thus, because one set of registers is being used, the x86mt, x86mf, x86smt, x86smf, x86fmt and x86fmf instructions would not be used.

Figure 4:
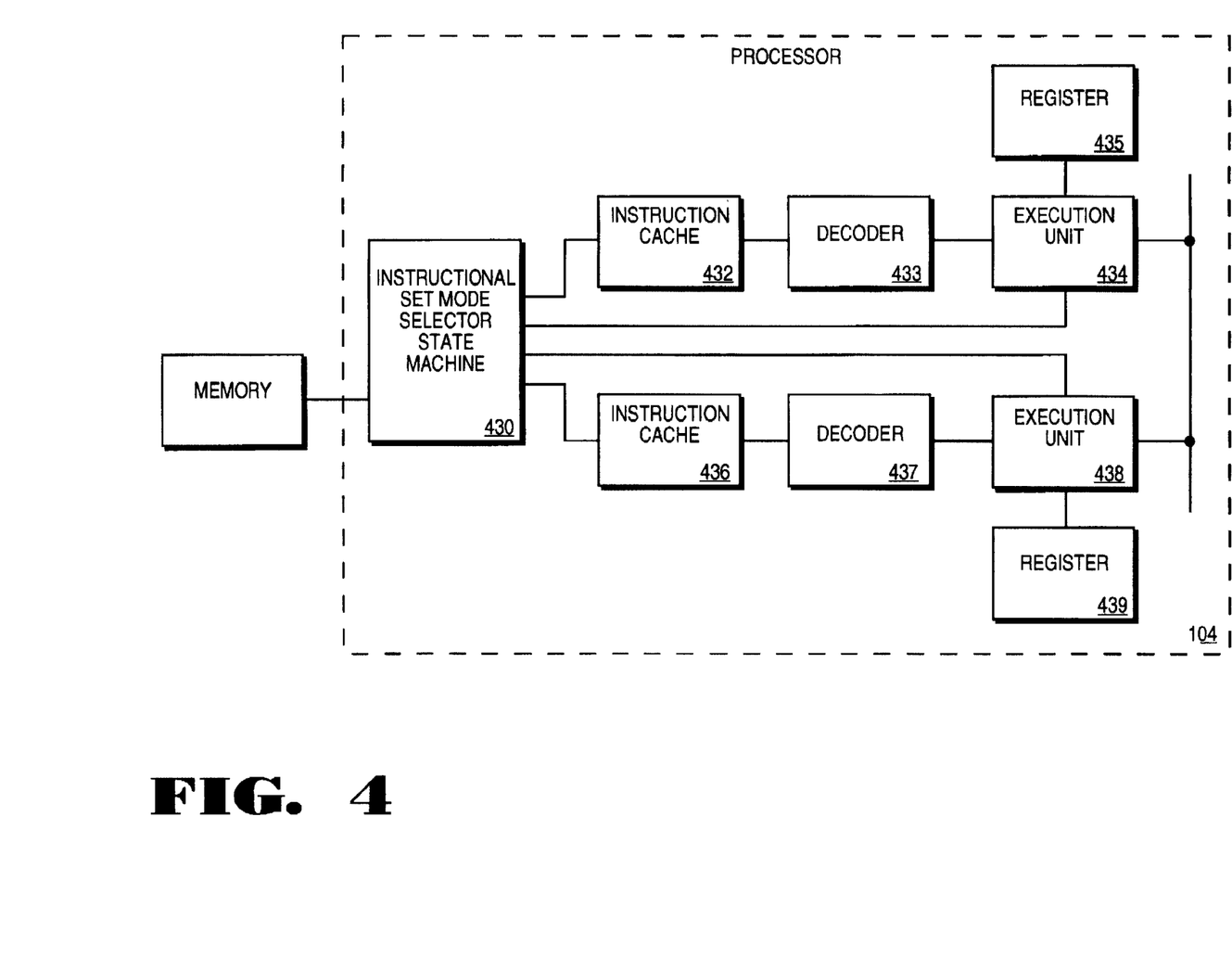
FIG. 4 illustrates in block diagram form a processor of a fourth embodiment of the present invention.

FIG. 4 illustrates in block diagram form a processor of a fourth embodiment of the present invention. Under this embodiment, processor 104 comprises instruction set mode selector state machine 430, instruction cache 432, decoder 433, execution unit 434, register 435, instruction cache 436, decoder 437, execution unit 438, and register 439. State machine 430 receives instructions from external memory. State machine 430 selects either instruction cache 432 or instruction cache 436 based upon the signal received from execution unit 434 or execution unit 438. When execution unit 438 transmits a first signal to state machine 430, state machine 430 selects instruction cache 432 and transmits instructions from memory to instruction cache 432. Processor 104 decodes and executes instructions in the first instruction set mode. When execution unit 436 transmits a second signal to state machine 430, state machine 430 selects instruction cache 436 and transmits instructions from memory to instruction cache 436. Here, processor 104 decodes and executes instructions in the second instruction set mode.

Like the third embodiment, when processor 104 powers up, it can power up in the first instruction set mode or the second instruction set mode depending on the initialization procedures. If processor 104 powers up in the first instruction set mode, a first signal is initially sent from execution unit 438 to state machine 430. On the other hand, if processor 104 powers up in the second instruction set mode, a second signal is transmitted from execution unit 434 to state machine 430.

In this embodiment, processor 104 powers up in the first instruction set mode. Thus, an initial value is transmitted to execution unit 438 causing execution unit 438 to transmit a first signal to state machine 430. Instructions from external memory is transmitted through state machine 430 to instruction cache 432. Instruction cache 432 stores instructions of the first instruction set until the instructions are decoded and executed by processor 104. At the appropriate time, individual instructions are transmitted from instruction cache 432 to decoder 433. Decoder 433 decodes instructions from instruction cache 432. The instructions from instruction cache 432 are instructions of the first instruction set. After the decoding of instructions of the first instruction set, execution unit 434 executes the instructions. Execution unit 434 is coupled to register 435 and stores values in register 435.

When execution unit 434 executes a jmpx instruction, execution unit 434 sends a second signal to state machine 430. In response to the second signal, state machine 430 selects instruction cache 436 as the destination for following individual instructions. The subsequent individual instructions are instructions of the second instruction set. Instruction cache 436 stores the individual instructions from external memory. At the appropriate time, decoder 437 retrieves individual instructions from instruction cache 436 and decodes the instructions. Execution unit 438 then executes the decoded instructions from decoder 437 in the second instruction set mode. Execution unit 438 is coupled to register 439 and stores values in register 439. Execution unit 438 is also coupled to execution unit 434 which is in turn coupled to register 435. Thus, in response to a x86mf, x86smf, or x86fmf instruction, execution unit 438 can retrieve values from register 435 for use while executing processor instructions of the second instruction set. Likewise, in response to a x86mt, x86smt or x86fmt instruction, execution unit 438 can also store values into register 435. When execution unit 438 executes a x86jmp instruction, it sends a first signal to state machine 430. In response to the first signal, state machine 430 then selects instruction cache 432 for subsequent instructions from external memory. In this manner, processor 104 can switch back to the first instruction set mode.

Processor 104 can further comprise a jmpx disable register. The jmpx disable register is coupled to execution unit 434. When the jmpx disable register is set, the jmpx instruction is nullified and a jmpx instruction results in a disabled 64 bit ISA fault. Processor 104 does not switch to the second instruction set mode in response to a jmpx instruction. Likewise, processor 104 can further comprise a x86jmp disable register. The x86jmp disable register is coupled to execution unit 438. When the x86jmp disable register is set, the x86jmp instruction is nullified and a x86jmp instruction results in a disabled x86 ISA fault. Processor 104 does not switch to the first instruction set mode in response to a x86jmp instruction.

Alternatively, register 435 is coupled to both execution unit 434 and execution unit 438. Register 435 stores values when processor 104 is in the first instruction set mode and also stores values when processor 104 is in the second instruction set mode. In this case, register 435 performs the functions of register 439 and register 439 is eliminated or incorporated into register 435. Thus, because one set of registers is being used, the x86mt, x86mf, x86smt, x86smf, x86fmt and x86fmf instructions would not be used.

Figure 5:
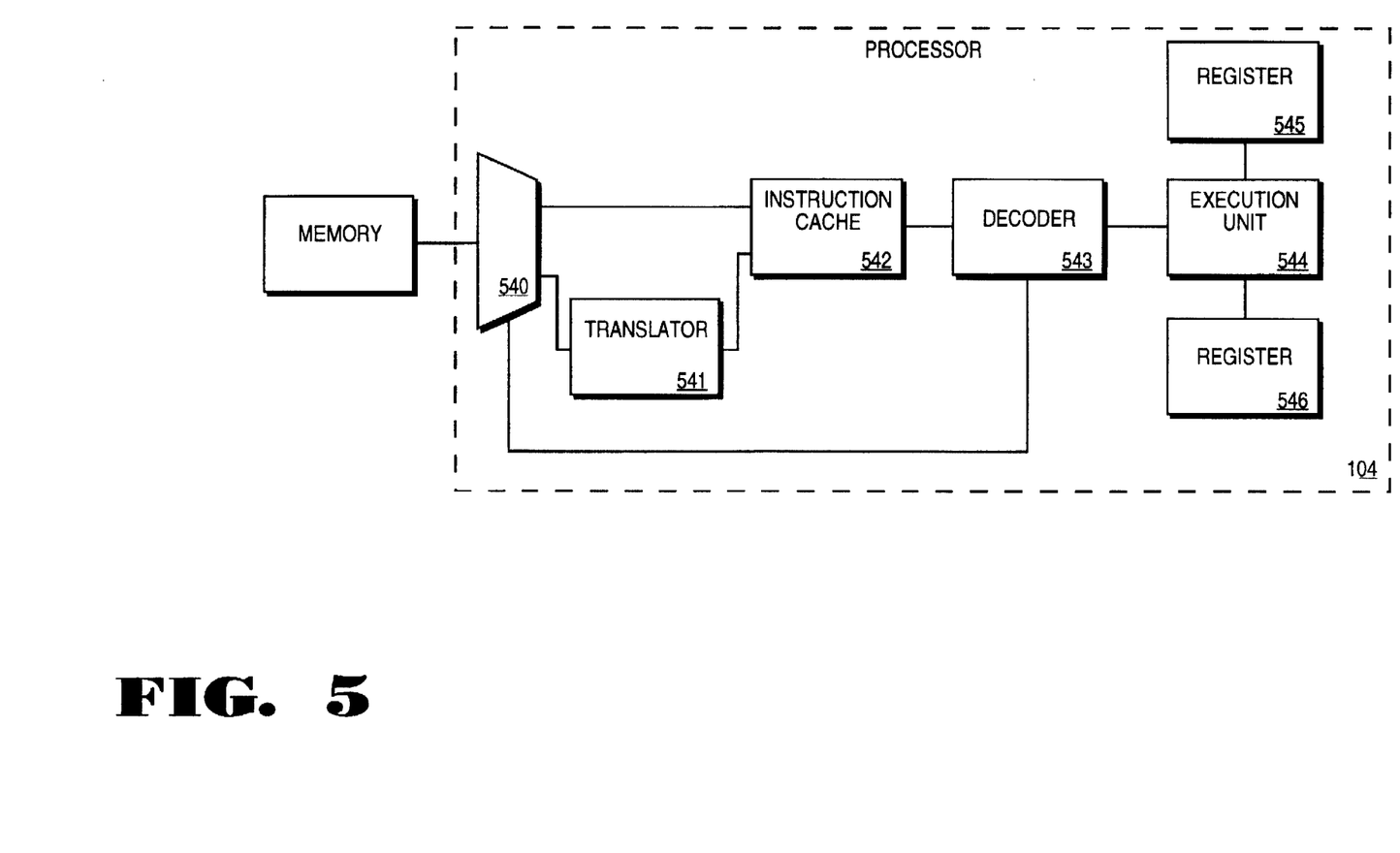
FIG. 5 illustrates in block diagram form a processor of a fifth embodiment of the present invention.

FIG. 5 illustrates in block diagram form a processor of a fifth embodiment of the present invention. Under this embodiment, processor 104 comprises demultiplexor 540, translator 541, instruction cache 542, decoder 543, execution unit 544, register 545 and register 546. Demultiplexor 540 is coupled to external memory and receives instructions from external memory. The instructions can be instructions of the first instruction set or instructions of the second instruction set. Demultiplexor 540 selects either translator 541 for translating the instructions from external memory into instructions of fie second instruction set or selects instruction cache 542 for storing the instructions from external memory until they are decoded and executed. The selection of demultiplexor 540 is based on the signal received by demultiplexor 540 from decoder 543. The first signal from decoder 543 causes demultiplexor 540 to select translator 541 and the first instruction set mode. A second signal from decoder 543 causes &multiplexor 540 to select instruction cache 542 and the second instruction set mode. When processor 104 initially powers up, processor 104 can power up in the first instruction set mode or the second instruction set mode depending on the initialization procedures. An initial value is transmitted to decoder 543 and decoder 543 in turn transmits fie first signal or the second signal in response to the value. In this example, processor 104 powers up in the first instruction set mode. Thus, demultiplexor 540 initially receives a first signal from decoder 543 and selects translator 541. Instructions transmitted from external memory through demultiplexor 540 is translated into instructions of the second instruction set by translator 541. Translator 541 comprises circuitry for translating instructions of the first instruction set into instructions of fie second instruction set. The translated instructions are then transmitted to instruction cache 542. Instruction cache 542 stores the instructions until they are decoded and executed. At the appropriate time for decoding instructions, instructions in instruction cache 542 are transmitted to decoder 543 for decoding of instructions from instruction cache 542. The instructions from instruction cache 542 are instructions of the second instruction set. After decoding, instructions of the second instruction set are transmitted to execution unit 544. Execution unit 544 executes the decoded instruction from decoder 543. Execution unit 544 is also coupled to register 545 which stores values when processor 104 is in the first instruction set mode. Execution unit 544 is also coupled to register 546 which stores values when processor 104 is in the second instruction set mode. Thus, in response to a x86mf, x86smf, or x86fmf instruction, execution unit 544 can retrieve values from register 545 used while executing processor instructions of the second instruction set. Likewise, in response to a x86mt, x86smt or x86fmt instruction, execution unit 544 can also store values into register 545.

When decoder 543 decodes a jmpx instruction, decoder 543 sends a second signal to demultiplexor 540. The second signal causes demultiplexor 540 to select instruction cache 542 and to transmit instructions from external memory to instruction cache 542. In this manner, processor 104 switches to the second instruction set mode. When decoder 543 decodes a x86jmp instruction, decoder 543 transmits a first signal to demultiplexor 540. In response to the first signal, demultiplexor 540 selects translator 541 and transmits instructions from external memory to translator 541. In this manner, processor 104 can return back to the first instruction set mode.

Processor 104 can further comprise a jmpx disable register. The jmpx disable register is coupled to decoder 543. When the jmpx disable register is set, the jmpx instruction is nullified and a jmpx instruction results in a disabled 64 bit ISA fault. Processor 104 does not switch to the second instruction set mode in response to a jmpx instruction. Likewise, processor 104 can further comprise a x86jmp disable register. The x86jmp disable register is coupled to decoder 543. When the x86jmp disable register is set, the x86jmp instruction is nullified and a x86jmp instruction results in a disabled x86 ISA fault. Processor 104 does not switch to the first instruction set mode in response to a x86jmp instruction.

Alternatively, register 545 stores values when processor 104 is in the first instruction set mode and also stores values when processor 104 is in the second instruction set mode. In this case, register 545 performs the functions of register 546 and register 546 is eliminated or incorporated into register 545. Thus, because one set of registers is being used, the x86mt, x86mf, x86smt, x86smf, x86fmt and x86fmf instructions would not be used.

Figure 6:
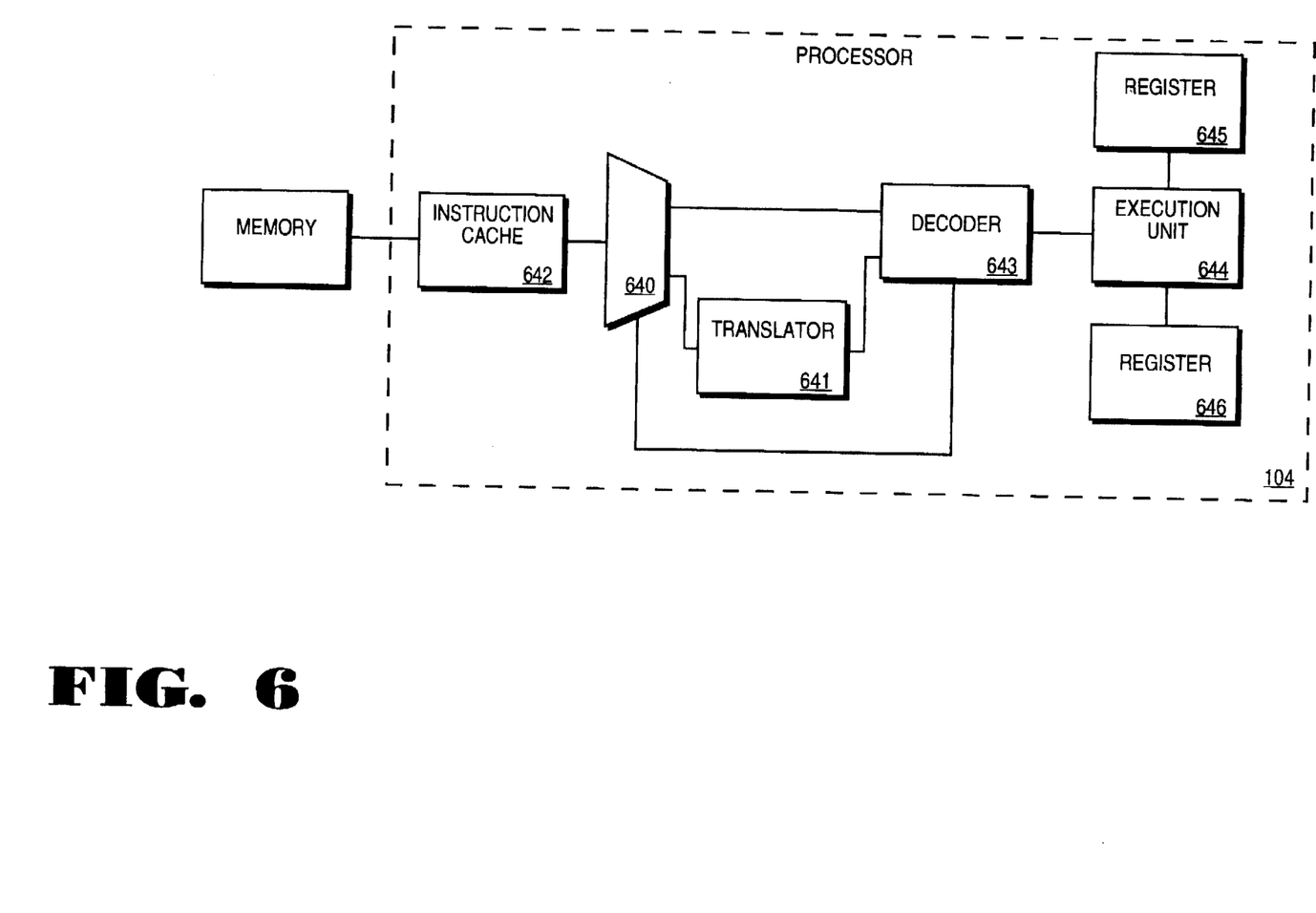
FIG. 6 illustrates in block diagram form a processor of a sixth embodiment of the present invention.

FIG. 6 illustrates in block diagram form a processor of a sixth embodiment of the present invention. The processor of the sixth embodiment is similar to the processor of the fifth embodiment with the following exceptions. Instruction cache 642 is coupled to external memory. Demultiplexor 640 is coupled to instruction cache 642. Translator 641 and decoder 643 are coupled to demultiplexor 640. Decoder 643 is also coupled to translator 641. Execution unit 644 is coupled to decoder 643. Register 645 and register 646 are coupled to execution unit 644.

Instruction cache 642 receives instructions from external memory. The instructions can be instructions of the first instruction set or instructions of the second instruction set. Demultiplexor 640 receives instructions from instruction cache 642. Demultiplexor 640 selects either translator 641 for translating the instructions from instruction cache 642 into instructions of the second instruction set or selects decoder 643 for decoding the instructions from instruction cache 642. The selection of demultiplexor 640 is based on the signal received by demultiplexor 640 from decoder 643. The first signal from decoder 643 causes demultiplexor 640 to select translator 641 and the first instruction set mode. A second signal from decoder 643 causes demultiplexor 640 to select decoder 643 and the second instruction set mode. When processor 104 initially powers up, processor 104 can power up in the first instruction set mode or the second instruction set mode depending on the initialization procedures. An initial value is transmitted to decoder 643 and decoder 643 in turn transmits the first signal or the second signal in response to the value. In this example, processor 104 powers up in the first instruction set mode. Thus, demultiplexor 640 initially receives a first signal from decoder 643 and selects translator 641. Instructions transmitted from instruction cache 642 through demultiplexor 640 is translated into instructions of the second instruction set by translator 641. Translator 641 comprises circuitry for translating instructions of the first instruction set into instructions of the second instruction set. The translated instructions are then transmitted to decoder 643. After decoding, instructions of the second instruction set are transmitted to execution unit 644. Execution unit 644 executes the decoded instruction from decoder 643. Execution unit 644 is also coupled to register 645 which stores values when processor 104 is in the first instruction set mode. Execution unit 644 is also coupled to register 646 which stores values when processor 104 is in the second instruction set mode. Thus, in response to a x86mf, x86smf, or x86fmf instruction, execution unit 644 can retrieve values from register 645 used while executing processor instructions of the second instruction set. Likewise, in response to a x86mt, x86smt or x86fmt instruction, execution unit 644 can also store values into register 645.

When decoder 643 decodes a jmpx instruction, decoder 643 sends a second signal to demultiplexor 640. The second signal causes demultiplexor 640 to select decoder 643 and to transmit instructions from instruction cache 642 to decoder 643. In this manner, processor 104 switches to the second instruction set mode. When decoder 643 decodes a x86jmp instruction, decoder 643 transmits a first signal to demultiplexor 640. In response to the first signal, demultiplexor 640 selects translator 641 and transmits instructions from instruction cache 642 to translator 641. In this manner, processor 104 can return back to the first instruction set mode.

Processor 104 can further comprise a jmpx disable register. The jmpx disable register is coupled to decoder 643. When the jmpx disable register is set, the jmpx instruction is nullified and a jmpx instruction results in a disabled 64 bit ISA fault. Processor 104 does not switch to the second instruction set mode in response to a jmpx instruction. Likewise, processor 104 can further comprise a x86jmp disable register. The x86jmp disable register is coupled to decoder 643. When the x86jmp disable register is set, the x86jmp instruction is nullified and a x86jmp instruction results in a disabled x86 ISA fault. Processor 104 does not switch to the first instruction set mode in response to a x86jmp instruction.

Alternatively, register 645 stores values when processor 104 is in the first instruction set mode and also stores values when processor 104 is in the second instruction set mode. In this case, register 645 performs the functions of register 646 and register 646 is eliminated or incorporated into register 645. Thus, because one set of registers is being used, the x86mt, x86mf, x86smt, x86smf, x86fmt and x86fmf instructions would not be used.

Figure 7:
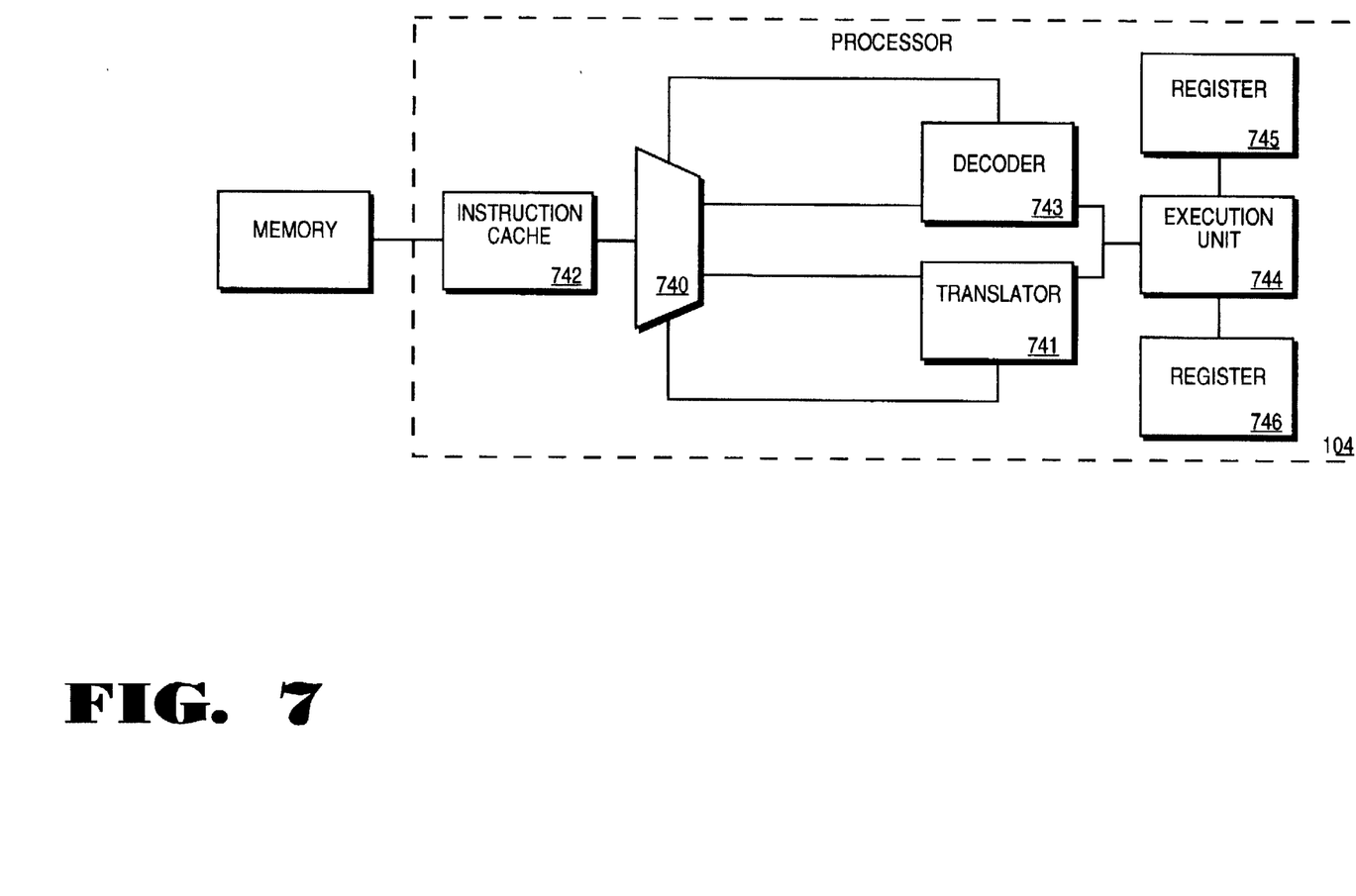
FIG. 7 illustrates in block diagram form a processor of a seventh embodiment of the present invention.

FIG. 7 illustrates in block diagram form a processor of a seventh embodiment of the present invention. The processor of the seventh embodiment is similar to the processor of the sixth embodiment with the following exceptions. Instruction cache 742 is coupled to external memory. Demultiplexor 740 is coupled to instruction cache 742. Translator 741 and decoder 743 are coupled to demultiplexor 740. Execution unit 744 is coupled to decoder 743 and translator 741. Register 745 and register 746 are coupled to execution unit 744.

Instruction cache 742 receives instructions from external memory. The instructions can be instructions of the first instruction set or instructions of the second instruction set. Demultiplexor 740 receives instructions from instruction cache 742. Demultiplexor 740 selects either translator 741 for translating and decoding the instructions from instruction cache 742 or selects decoder 743 for decoding the instructions from instruction cache 742. The selection of demultiplexor 740 is based on the signal received by demultiplexor 740 from decoder 743 and translator 741. The first signal from decoder 743 causes demultiplexor 740 to select translator 741 and the first instruction set mode. A second signal from translator 741 causes demultiplexor 740 to select decoder 743 and the second instruction set mode. When processor 104 initially powers up, processor 104 can power up in the first instruction set mode or the second instruction set mode depending on the initialization procedures. An initial value is transmitted to decoder 743 and translator 741. Decoder 743 or translator 741 in turn transmits the first signal or the second signal in response to the value. In this example, processor 104 powers up in the first instruction set mode. Thus, demultiplexor 740 initially receives a first signal from decoder 743 and selects translator 741. Instructions transmitted from instruction cache 742 through demultiplexor 740 is translated and decoded by translator 741. Translator 741 comprises circuitry for translating and decoding instructions of the first instruction set. The translated and decoded instructions are then transmitted to execution unit 744 which executes the decoded instructions. Execution unit 744 is also coupled to register 745 which stores values when processor 104 is in the first instruction set mode. Execution unit 744 is also coupled to register 746 which stores values when processor 104 is in the second instruction set mode.

Thus, in response to a x86mf, x86smf, or x86fmf instruction, execution unit 744 can retrieve values from register 745 used while executing processor instructions of the second instruction set. Likewise, in response to a x86mt, x86smt or x86fmt instruction, execution unit 744 can also store values into register 745.

When translator 741 receives a jmpx instruction, translator 741 sends a second signal to demultiplexor 740. The second signal causes demultiplexor 740 to select decoder 743 and to transmit instructions from instruction cache 742 to decoder 743. In this manner, processor 104 switches to the second instruction set mode. When decoder 743 decodes a x86jmp instruction, decoder 743 transmits a first signal to demultiplexor 740. In response to the first signal, demultiplexor 740 selects translator 741 and transmits instructions from instruction cache 742 to translator 741. In this manner, processor 104 can return back to the first instruction set mode.

Processor 104 can further comprise a jmpx disable register. The jmpx disable register is coupled to translator 741. When the jmpx disable register is set, the jmpx instruction is nullified and a jmpx instruction results in a disabled 64 bit ISA fault. Processor 104 does not switch to the second instruction set mode in response to a jmpx instruction. Likewise, processor 104 can further comprise a x86jmp disable register. The x86jmp disable register is coupled to decoder 743. When the x86jmp disable register is set, the x86jmp instruction is nullified and a x86jmp instruction results in a disabled x86 ISA fault. Processor 104 does not switch to the first instruction set mode in response to a x86jmp instruction.

Alternatively, register 745 stores values when processor 104 is in the first instruction set mode and also stores values when processor 104 is in the second instruction set mode. In this case, register 745 performs the functions of register 746 and register 746 is eliminated or incorporated into register 745. Thus, because one set of registers is being used, the x86mt, x86mf, x86smt, x86smf, x86fmt and x86fmf instructions would not be used.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for transitioning between instruction sets in a processor has been described.

What is claimed is:

1. A processor for running a program that includes instructions of first and second instruction sets, wherein said first instruction set is a complex instruction set computer architecture (CISC) type and said second instruction set is a reduced instruction set computer architecture (RISC) type, said data processor comprising:
  one or more cache memories that store a sequence of instructions of said program;

an instruction processing unit coupled to said one or more cache memories that decodes and executes a first instruction in said sequence from said first instruction set and a second instruction in said sequence from said second instruction set;

first and second register files respectively associated with said first and second instruction sets, wherein data associated with said first instruction is stored in said first register file, and data associated with said second instruction is stored in said second register file.

2. The processor of claim 1 wherein said instruction processing unit comprises:

a first decoder coupled to said one or more cache memories that decodes said first instruction;

a second decoder coupled to said one or more cache memories that decodes said second instruction;

a multiplexor having an output and inputs coupled to said first and second decoders;

an execution unit coupled to said output of said multiplexor that executes the first and second instructions, said execution unit writing a first result of said first instruction to said first register file, and a second result of said second instruction to said second register file.

3. The processor of claim 2 wherein said program includes a switch instruction and said instruction processing unit further comprises:

an instruction set mode selector (ISMS) coupled to said first and second decoders and to said multiplexor, wherein said ISMS generates a select signal that selects said output of said multiplexor in response to said switch instruction.

4. The processor of claim 1 wherein said first instruction comprises 32-bits and said second instruction comprises 64-bits.

5. A computer system comprising:

a bus;

an external memory coupled to said bus;

a microprocessor coupled to said external memory and said bus, said microprocessor including:

first and second register files;

an instruction cache that stores first and second instructions of a program;

a first decoder coupled to said instruction cache that decodes said first instruction;

a second decoder coupled to said instruction cache that decodes said second instruction;

a multiplexor having inputs coupled to said first and second decoders, and an output;

an execution unit coupled to said output of said multiplexor that executes said first and second instructions, with a first result of said first instruction being written to said first register file, and a second result of said second instruction being written to said second register file.

6. The computer system of claim 5 wherein said execution unit comprises:

a first execution unit coupled to said first decoder that executes said first instruction;

a second execution unit coupled to said second decode that executes said second instruction.

7. The computer system of claim 6 wherein said microprocessor further comprises:

a translator unit coupled to said instruction cache, said translator unit being adapted to translate said first instruction of said first instruction set into corresponding instruction(s) of said second instruction set, said instruction cache storing said corresponding instruction (s) of said second instruction set.

8. The computer system of claim 5 wherein said first instruction set is a complex instruction set computer architecture (CISC) type and said second instruction set is a reduced instruction set computer architecture (RISC) type.

9. In a processor having first and second instruction set operating modes, a method for executing a program that contains instructions of first and second instruction sets, said method comprising steps of:

(a) executing a first instruction of said first instruction set while said processor is in said first instruction set operating mode;

(b) receiving a first interruption indication;

(c) servicing said first interruption indication while said processor is in said second instruction set operating mode;

(d) returning to said first instruction set operating mode.

10. The method of claim 9 wherein said first instruction set is a CISC instruction set and said second instruction set is a RISC instruction set.

11. The method of claim 9 wherein said first instruction set is a RISC instruction set and said second instruction set is a CISC instruction set.

12. The method of claim 9 wherein said first instruction set is a 64-bit instruction set and said second instruction set is a 16 or 32-bit instruction set.

13. The method of claim 9 wherein said first instruction set is a 16 or 32-bit instruction set and said second instruction set is a 64-bit instruction set.

14. In a processor, a method for executing a program that contains RISC and CISC instructions comprising steps of:

(a) executing a first instruction in said program, said first instruction being one of said CISC instructions;

(b) executing a switch instruction, the switch instruction including a value that indicates a location of a next instruction in said program; and (c) executing said next instruction in said program, said next instruction being one of said RISC instructions.

15. The method of claim 14 wherein step (b) further comprises the step of:

converting, by said processor, said value into and address of said next instruction.

16. The method of claim 14 wherein said RISC instructions comprise 64-bit instructions and said CISC instructions comprises 16 or 32-bit instructions.

17. In a processor, a method for executing instructions of a computer program comprising steps of:

(a) executing a first instruction of a first instruction set;

(b) executing a first switch instruction that changes said processor from a first instruction set mode to a second instruction set mode of operation;

(c) executing a second instruction of a second instruction set.

18. The method of claim 17 further comprising the additional steps of:

(d) executing a second switch instruction that changes said processor from said second instruction set mode to said first instruction set mode of operation;

(e) executing a second instruction of said first instruction set.

19. The method of claim 17 wherein step (e) moves a data value from a register associated with said first instruction set to a register associated with said second instruction set.

* * * * *

UNITED STATES PATENT AND TRADEMARK OFFICE
CERTIFICATE OF CORRECTION

PATENT NO. : 5,638,525
DATED : June 10, 1997
INVENTOR(S) : Hammond et al.

It is certified that error appears in the above-identified patent and that said Letters Patent is hereby corrected as shown below:

In column 19 at line 60 delete "decode" and insert --decoder--

Signed and Sealed this

Sixteenth Day of September, 1997

Attest:

BRUCE LEHMAN

*Attesting Officer*          *Commissioner of Patents and Trademarks*